United States Patent
Shi et al.

(10) Patent No.: US 10,451,074 B2
(45) Date of Patent: Oct. 22, 2019

(54) ELECTRIC PUMP

(71) Applicant: Hangzhou Sanhua Research Institute Co., Ltd., Hangzhou, Zhejiang (CN)

(72) Inventors: Yongxiang Shi, Zhejiang (CN); Junfeng Bao, Zhejiang (CN); Hongmin Song, Zhejiang (CN)

(73) Assignee: Zhejiang Sanhua Automotive Components Co., Ltd., Hangzhou, Zhejiang (CN)

( * ) Notice: Subject to any disclaimer, the term of this patent is extended or adjusted under 35 U.S.C. 154(b) by 512 days.

(21) Appl. No.: 15/272,992

(22) Filed: Sep. 22, 2016

(65) Prior Publication Data

US 2017/0089354 A1 Mar. 30, 2017

(30) Foreign Application Priority Data

Sep. 30, 2015 (CN) .......................... 2015 1 0642266

(51) Int. Cl.
*F04D 13/06* (2006.01)
*H02K 1/27* (2006.01)
(Continued)

(52) U.S. Cl.
CPC ....... *F04D 13/0606* (2013.01); *F04D 29/041* (2013.01); *F04D 29/628* (2013.01);
(Continued)

(58) Field of Classification Search
CPC .. F04D 13/0606; F04D 29/628; F04D 29/041; H02K 5/1677; H02K 7/086; H02K 1/278; H02K 5/128
See application file for complete search history.

(56) References Cited

U.S. PATENT DOCUMENTS

| 8,053,941 | B2 * | 11/2011 | Moore | ............... | H02K 5/128 |
| | | | | | 310/12.01 |
| 8,601,686 | B2 * | 12/2013 | Matsunaga | ......... | F04D 29/628 |
| | | | | | 29/888.02 |
| 2007/0237660 | A1 * | 10/2007 | Akiyoshi | ............. | F04D 29/628 |
| | | | | | 417/423.11 |

FOREIGN PATENT DOCUMENTS

| EP | 1580434 A1 | 9/2005 |
| EP | 2565466 A2 | 3/2013 |
| | (Continued) | |

OTHER PUBLICATIONS

Extended European Search Report for Application No. EP 16190300.0 dated Feb. 6, 2017.
(Continued)

*Primary Examiner* — Woody A Lee, Jr.
(74) *Attorney, Agent, or Firm* — Wolf, Greenfield & Sacks, P.C.

(57) ABSTRACT

An electric pump is provided, which includes a housing, a shaft, a rotor assembly and a stop assembly. The shaft is fixed to the housing, the rotor assembly is rotatable about the shaft, and the rotor assembly is sleeved on the shaft. The stop assembly is configured to limit the position of the rotor assembly in the chamber. The stop assembly includes a first stop and a second stop, the first stop is fixed with respect to a second portion of the shaft, and the second stop is fixed with respect to a first portion of the shaft. No relative movement occurs between the stop assembly and the shaft, which reduces the abrasion between the stop assembly and the shaft resulted from friction, and facilitates improving a service life of the stop assembly.

12 Claims, 8 Drawing Sheets

(51) Int. Cl.
*F04D 29/041* (2006.01)
*F04D 29/62* (2006.01)
*H02K 5/128* (2006.01)
*H02K 5/167* (2006.01)
*H02K 7/08* (2006.01)

(52) U.S. Cl.
CPC .......... *H02K 1/278* (2013.01); *H02K 5/128* (2013.01); *H02K 5/1677* (2013.01); *H02K 7/086* (2013.01); *H02K 2205/03* (2013.01); *H02K 2213/03* (2013.01)

(56) References Cited

FOREIGN PATENT DOCUMENTS

| | | |
|---|---|---|
| GB | 2496014 A | 5/2013 |
| JP | 2000-085305 A | 3/2000 |
| JP | 2005-282371 A | 10/2005 |
| KR | 10-1185717 B1 | 9/2012 |
| WO | WO 2013/190790 A1 | 12/2013 |

OTHER PUBLICATIONS

Korean Office Action for Application No. 10-2016-0124644 dated Sep. 13, 2017.

\* cited by examiner

ELECTRIC PUMP

CROSS REFERENCE OF RELATED APPLICATION

The present application claims the priority to Chinese Patent Application No. 201510642266.0, titled "ELECTRIC PUMP", filed on Sep. 30, 2015, with the State Intellectual Property Office of the People's Republic of China, which is hereby incorporated by reference to the maximum extent allowable by law.

FIELD

This application relates to a heat circulation system, and particularly to an electric pump.

BACKGROUND

In recent decades, electric pumps have gradually replaced the conventional mechanical pumps and are widely used in heat circulation systems. The electric pumps have advantages of little electromagnetic interference, being efficient and environmental friendly, and stepless speed regulation etc., thus can meet the requirements of market well.

The electric pump includes an impeller and a rotor, and the impeller and the rotor rotate around a shaft. The position of the impeller is limited by a position-limiting device in an axial direction of the shaft. However, when the electric pump operates, the position-limiting device may rotate relative to the shaft, which may cause abrasion of the position-limiting device, and even a function failure of the position-limiting device.

Therefore, it is necessary to improve the conventional technology, to address the above technical issues.

SUMMARY

An object of the present application is to provide an electric pump, which can improve the performance of a position-limiting device.

To achieve the above object, the following technical solutions are adopted in the present application. An electric pump is provided, which includes a housing, a shaft and a rotor assembly. A chamber is defined by the housing, and the rotor assembly is arranged in the chamber. The shaft includes a first portion and a second portion, the first portion is fixed to the housing, and the second portion is extended into the chamber. The rotor assembly is rotatable around the shaft, and the rotor assembly is sleeved on an outer peripheral surface of the shaft. The electric pump includes a stop assembly, and the stop assembly is configured to limit a position of the rotor assembly in the chamber. The stop assembly includes a first stop and a second stop, the first stop is configured to limit a position of the rotor assembly moving along the shaft in a direction away from the first portion, and the second stop is configured to limit a distance of the rotor assembly moving along the shaft in a direction towards the first portion. The first stop is fixed to the second portion, and the second stop is fixed to the first portion.

Compared with the conventional technology, the electric pump according to the present application includes the stop assembly configured to limit the position of the rotor assembly. The stop assembly includes the first stop and the second stop. The first stop and the second stop are fixed with respect to the shaft, which avoids abrasion caused by the relative movement between the stop assembly and the shaft and facilitates improving a service life of the stop assembly.

DETAILED DESCRIPTION

The present application is further described with reference to the drawings and embodiments hereinafter.

Figure 1:
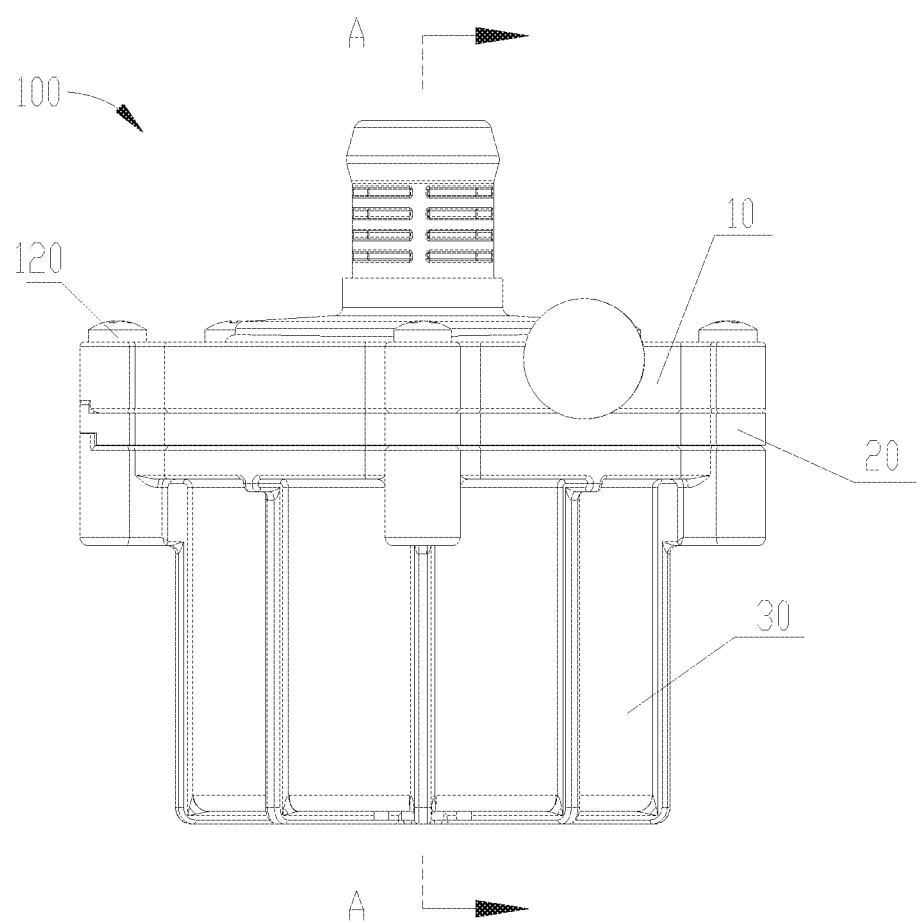
FIG. 1 is a schematic view showing the structure of an electric pump according to an embodiment of the present application.
Figure 2:
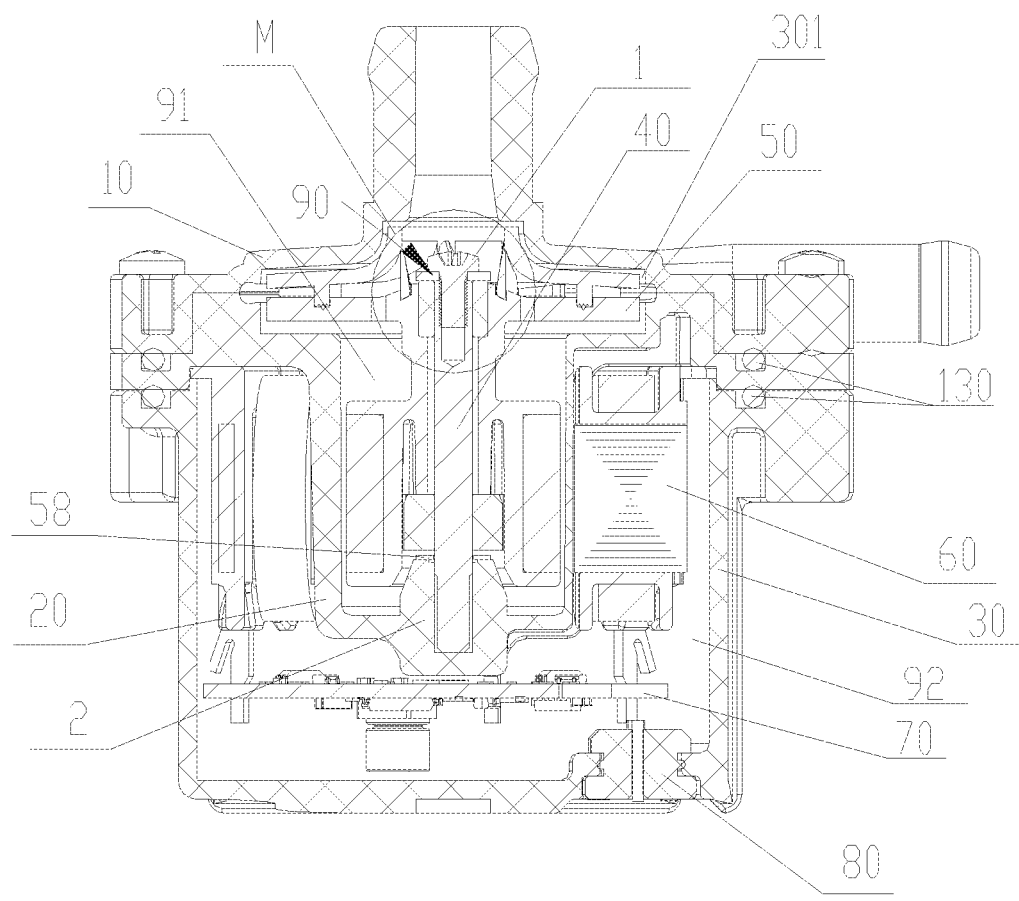
FIG. 2 is sectional schematic view showing the structure of the electric pump in FIG. 1 taken along line A-A.

FIG. 1 is a schematic view showing the structure of an electric pump 100 according to an embodiment. The electric pump 100 includes a housing, and the housing is able to form a chamber. In this embodiment, the housing includes a first housing 10, a partition 20 and a motor housing 30. In this embodiment, the first housing 10, the partition 20 and the motor housing 30 are respectively formed by injection molding. The first housing 10 is fixed to the partition 20 by a screw 120 or a bolt, and the partition 20 is fixed to the motor housing 30 by a screw 120 or a bolt. A connecting portion where the first housing 10 is connected to the partition 20 and a connecting portion where the partition 20 is connected to the motor housing 30 are respectively provided with a sealing ring 130 (referring to FIG. 2), which may improve the sealing performance of the connecting portions. Referring to FIG. 2, the chamber is partitioned by the partition 20 into a wet chamber 91 and a dry chamber 92. A working medium may flow through the wet chamber 91, and no working medium flows through the dry chamber 92. Apparently, the housing may have other structures. The structure of the housing according to this embodiment has a relatively simple manufacturing process and parts and components thereof are convenient to assemble. The electric pump 100 in this embodiment is mainly applied in a heat circulation system, and the heat circulation system includes a cooling circulation system and/or a heating circulation system. The electric pump 100 is configured to provide a circulating power to the working medium. The electric pump 100 according to this embodiment may be applied in a vehicle cooling circulation system. The electric pump 100 in this embodiment is a pump with a small size and a high lift.

Referring to FIG. 2, the electric pump 100 further includes a shaft 40, a rotor assembly 50, a stator assembly 60, a control unit 70 and a wire-through member 80. The rotor assembly 50 is arranged in the wet chamber 91, and the stator assembly 60 and the control unit 70 are arranged in the dry chamber 92. The shaft 40 and the partition 20 are fixed to each other by injection molding, and the rotor assembly 50 is rotatable about the shaft 40. The rotor assembly 50 includes an impeller and a rotor, and the rotor includes a permanent magnet. The rotor assembly 50 is isolated from the stator assembly 60 by the partition 20, and the stator assembly 60 is electrically connected to the control unit 70. The control unit 70 is electrically connected to an external power supply, a signal circuit or the like by connecting wires, and the connecting wires are led to the outside of the electric pump via wire-through member 80. In this embodiment, the electric pump 100 is an inner rotor type electric pump, and the inner rotor type electric pump refers to a pump in which the permanent magnet of the rotor assembly 50 is arranged to be closer to the shaft 40 than the stator assembly 60.

Figure 3:
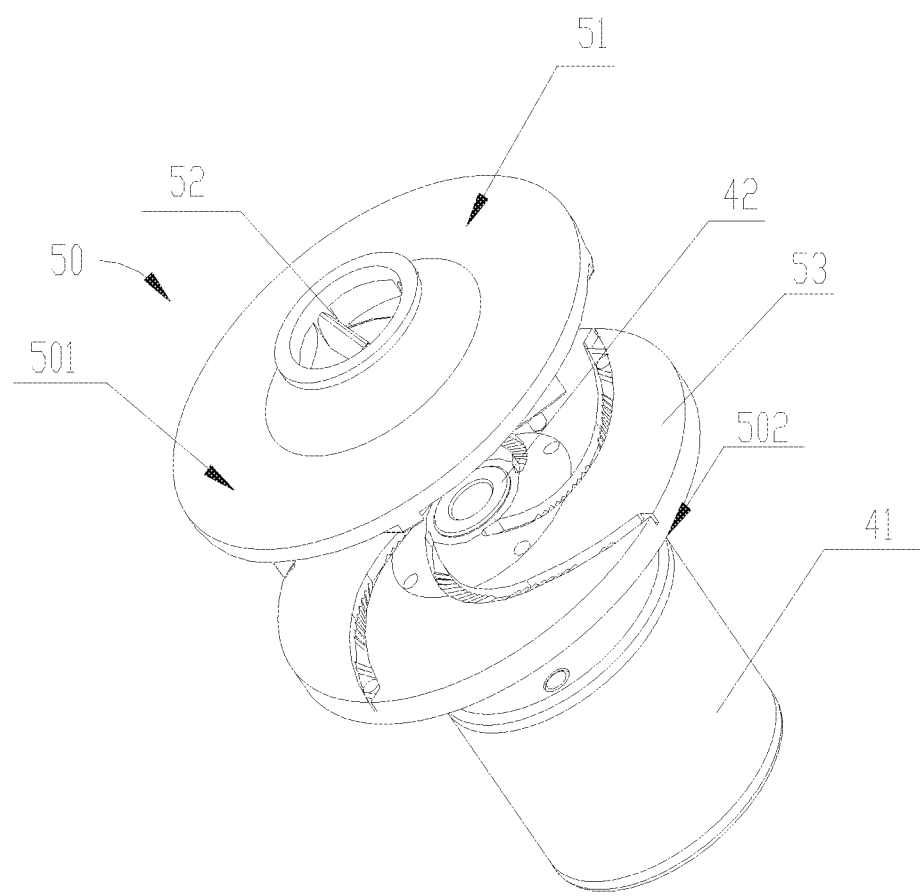
FIG. 3 is an exploded schematic view showing the structure of a rotor assembly in FIG. 2.
Figure 4:
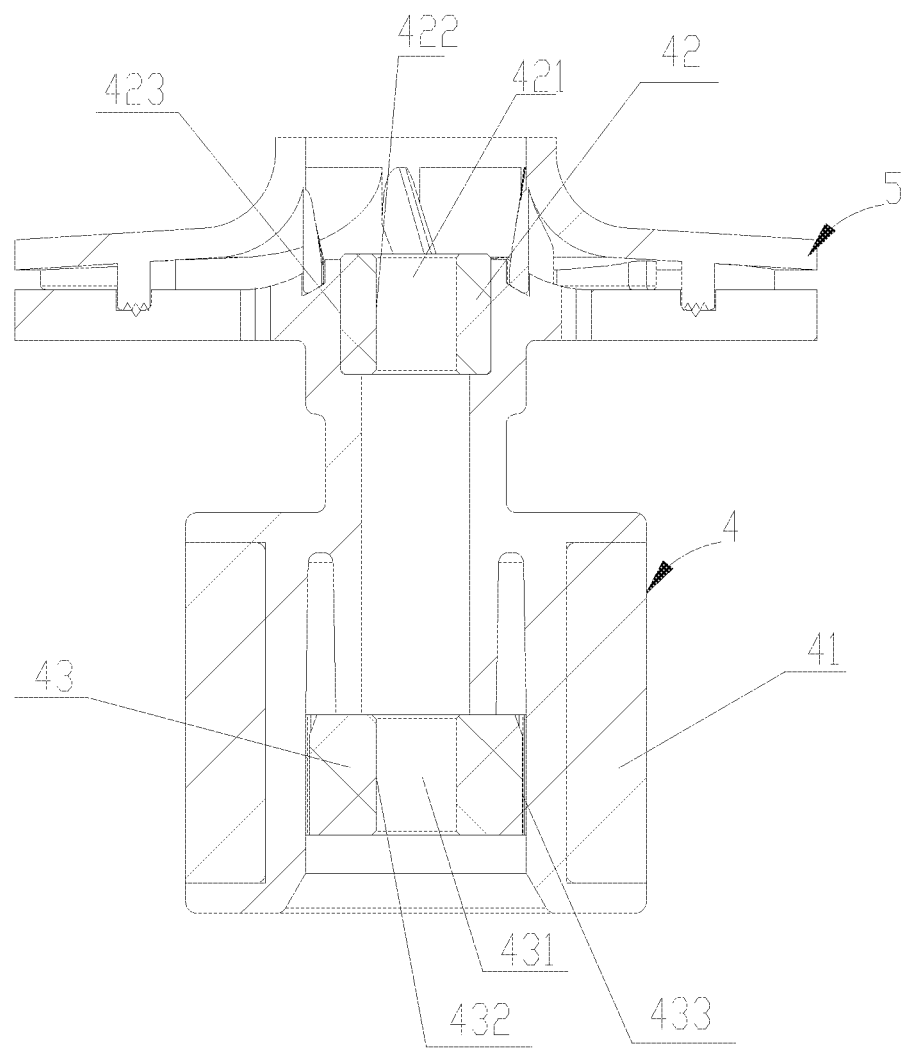
FIG. 4 is a sectional schematic view showing the structure of the rotor assembly in FIG. 2.
Figure 5:
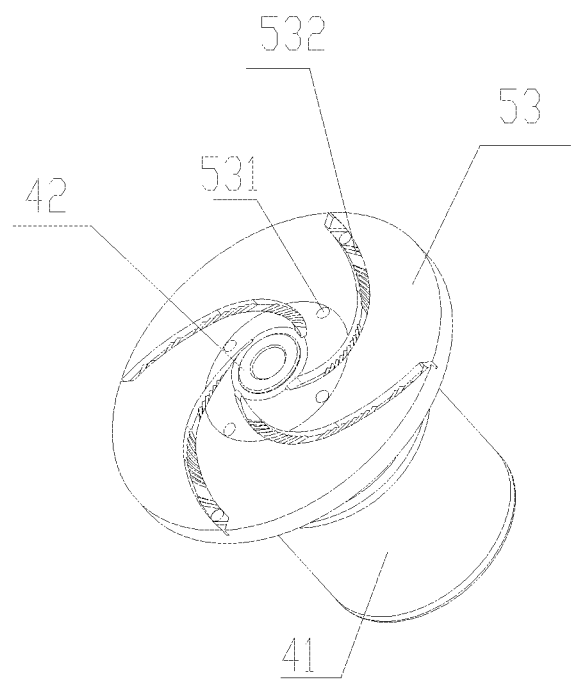
FIG. 5 is a perspective schematic view showing the structure of a second part in FIG. 3.

Referring to FIG. 3 and FIG. 4, the rotor assembly 50 at least includes injection molded members of two parts, namely a first part 501 and a second part 502. The first part 501 is fixed to the second part 502 by welding, for example, by ultrasonic welding. The first part 501 includes an upper plate 51 and blades 52, and is formed integrally by injection molding. In an embodiment, the material of the first part 501 is a mixture of polyphenylene sulfide plastic (abbreviated as PPS plastics) and glass fibers. The second part 502 includes a lower plate 53, a permanent magnet 41 and a first bearing 42. The second part 502 includes an injection molded layer, and the second part 502 is formed by injection molding using an injection molding material taking the permanent magnet 41 and the first bearing 42 as injection molding inserts. In an embodiment, the injection molding material of the second part 502 may be a mixture of polyphenylene sulfide plastic (abbreviated as PPS plastics) and glass fibers. In addition, the injection molding material of the second part 502 may also be other thermoplastic materials having relatively good mechanical properties. The first part 501 and the second part 502 are fixed as a whole by welding. The rotor assembly 50 includes an impeller 5 and a rotor 4 according to the function. The impeller 5 includes an upper plate 51, a lower plate 53 and blades 52, and the rotor 4 includes a permanent magnet 41. In this embodiment, the rotor 4 and the lower plate 53 are integrally formed by injection molding, the upper plate 51 and the blades 52 are integrally formed by injection molding. In this way, the upper plate 51 and the blades 52 have a low requirement for materials, which may save costs and facilitate the demolding of these two portions as well. Mounting grooves 532 are formed in the lower plate 53, and the blades 52 are assembled to the lower plate 53 corresponding to the mounting grooves 532 and are fixed to the lower plate 53 integrally by welding. Apparently, the blades 52 and the lower plate 53 may also be connected by other ways, for example, the impeller 5 and the rotor 4 are separately formed, and then are connected to each other by a connecting structure.

Referring to FIG. 4, the material of the first bearing 42 includes graphite or polyetheretherketone. The first bearing 42 is provided with a first hole 421, and the first bearing 42 includes a first inner surface 422 and a first outer surface 423. The shaft 40 passes through the first hole 421, and the first inner surface 422 may be configured to cooperate with the shaft 40. The first outer surface 423 is fixed to the injection molded layer of the second part 502 by injection molding. The first inner surface 422 and an outer peripheral surface of the shaft 40 are arranged with a clearance. An upper end surface of the first bearing 42 is slightly higher than an upper end of the lower plate 53. In this way, in the case that the rotor assembly 50 moves upward, a first stop is in contact with the upper end surface of the first bearing 42, and may not be in contact with the lower plate 53, thereby avoiding the abrasion of the lower plate 53.

Figure 6:
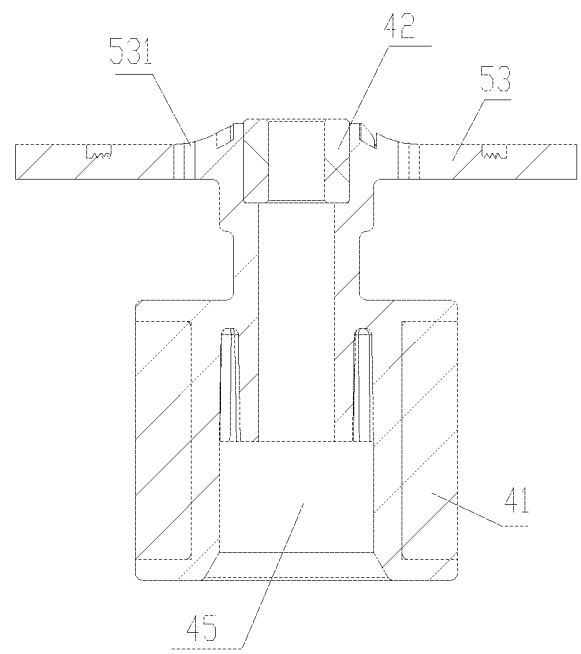
FIG. 6 is a sectional schematic view showing the structure of the second part in FIG. 5.

Referring to FIGS. 4 and 6, the rotor assembly 50 further includes a second bearing 43, and the second bearing 43 is detachably assembled and connected to the second part 502. Specifically, a mounting cavity 45 is formed in the second part 502, and the mounting cavity 45 is arranged to be away from the impeller 5. The second bearing 43 is mounted inside the mounting cavity 45. Material of the second bearing 43 includes a graphite or a polyetheretherketone. The second bearing 43 is provided with a second hole 431, and includes a second inner surface 432 and a second outer surface 433. The second hole 431 includes a space enclosed by the second inner surface 432. The second outer surface 433 may be fixed to the second part 502 directly or indirectly, and the second inner surface 432 may be arranged to be in contact with the outer peripheral surface of the shaft 40 or with a clearance from the outer peripheral surface of the shaft 40.

The rotor assembly 50 is relatively fixedly connected to the first bearing 42 and the second bearing 43. The shaft 40 passes through the first hole 421 and the second hole 431. The outer peripheral surface of the shaft 40 is in contact with the first inner surface 422 and the second inner surface 432, and the rotor assembly 50 rotates around the shaft 40 by means of the first bearing 42 and the second bearing 43. In this embodiment, the first bearing 42 and the second bearing 43 may be made of the graphite or the polyetheretherketone, which may have a self-lubricating function, thus may reduce a rotation friction force resulted from the rotation of the rotor assembly 50 with respect to the shaft 40, thereby reducing vibration of the rotor assembly 50 possibly caused by the friction.

Figure 7:
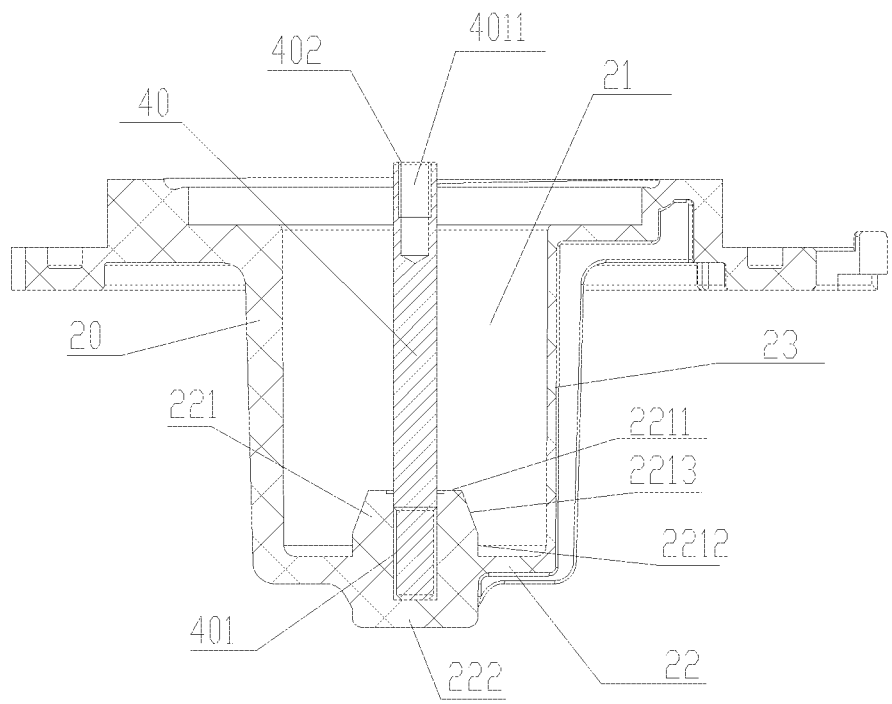
FIG. 7 is a sectional schematic view showing the structure of a partition assembly of the electric pump in FIG. 2.
Figure 9:
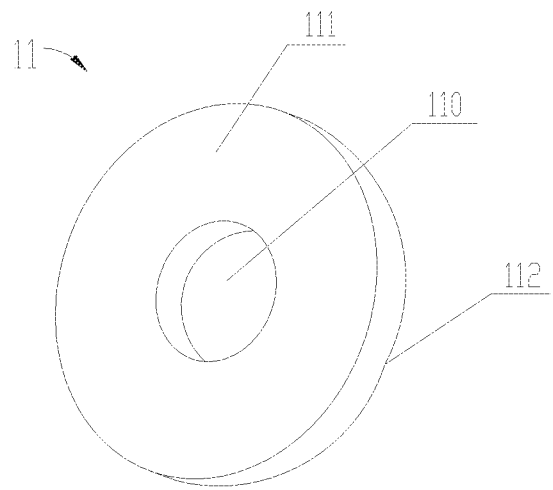
FIG. 9 is a perspective schematic view showing the structure of a stop element in FIG. 2.

Furthermore, a washer 58 may further be provided on a lower end surface of the second bearing 43 to reduce a friction force on the lower end surface when the second bearing 43 rotates. Referring to FIGS. 2, 7 and 9, the electric pump 100 further includes a stop assembly 90 for limiting the rotor assembly 50, and the rotor assembly 50 is limited inside the chamber by the stop assembly 90. Especially, the movement of the rotor assembly 50 is limited within a corresponding position range of the chamber. The stop assembly 90 includes the shaft 40, a first stop 1 and a second stop 2. Specifically, the rotor assembly 50 is arranged around the periphery of the shaft 40, and the shaft 40 limits a position of a rotating center of the rotor assembly 50. The first stop 1 is configured to limit the position of an upper end of the rotor assembly 50. Specifically, the first stop 1 is configured to limit the position of the rotor assembly 50 in the case that rotor assembly 50 moves towards an inlet of the electric pump 100 along the shaft 40 due to an axial force when the rotor assembly 50 is started. The second stop 2 is configured to limit the position of a lower end of the rotor assembly 50. Specifically, the second stop 2 is configured to limit the position of the rotor assembly 50 in the case that the rotor assembly 50 moves towards the first portion of the shaft 40 along the shaft 40 when the rotor assembly 50 is deactivated. The first stop 1 and the second stop 2 are fixed relative to the shaft 40, and may limit the position of the rotor assembly 50 relative to the shaft 40. In this way, the first stop 1 and the second stop 2 being fixed relative to the shaft 40 may reduce the abrasion to the first stop 1 and the second stop 2 caused by the shaft 40, and may further reduce the noise during the relative movement, and facilitate improving the service life of the product.

FIG. 7 is a schematic sectional view showing the structure of a partition assembly. The partition assembly includes the partition 20 and the shaft 40, the partition assembly is formed by injection molding taking the shaft 40 as an insert. A chamber 21 is formed in the partition 20, and the partition 20 includes a first bottom portion 22 and a first side wall 23. The chamber 21 includes a space defined by the first bottom portion 22 and the first side wall 23. The shaft 40 includes a first portion 401 and a second portion 402, and the first portion 401 is fixed to the partition 20 by injection molding. The second portion 402 extends into the chamber 21, and a threaded hole 4011 is provided in the shaft 40. The threaded hole 4011 extends into the second portion 402 along an axial direction of the shaft 40, and the first stop 1 is fixed to the shaft 40 via the threaded hole 4011.

In this embodiment, the shaft 40 is fixed to the first bottom portion 22 by injection molding, and the partition 20 includes a first protrusion 221 and a second protrusion 222. The first protrusion 221 is formed by protruding towards the chamber 21 from the first bottom portion 22, and the second protrusion 222 is formed by protruding towards the outside of the partition 20 from the first bottom portion 22. The first protrusion 221 is fixed around the outer periphery of the shaft 40, and the second protrusion 222 corresponds to a tail end of the shaft 40. Thus, the first protrusion 221 and the second protrusion 222 allow a fixing length of the partition 20 and the shaft 40 to be increased, thereby improving the strength of connection between the shaft 40 and the partition 20. The first protrusion 221 has a length larger than a length of the second protrusion 222, and an overall length of the partition 20 is reduced on the premise that the arrangements of parts in the chamber are not adversely affected, which allows the electric pump employing the partition 20 to be more compact. Furthermore, the shaft 40 may have a rough outer surface at the first portion 401, thus the connection between the shaft 40 and the first bottom portion 22 is more reliable, and a relative movement between the shaft 40 and the partition 20 is restricted.

The second stop 2 includes a first protrusion 221, or includes the first protrusion 221 and a washer 58. The first protrusion 221 includes a top portion 2211, a side portion 2212 and a transition portion 2213, and the top portion 2211 limits a position of the lower end surface of the second bearing 43. In the case that the rotor assembly 50 is motionless, the top portion 2211 is in a direct contact with the lower end surface of the second bearing 43, or is in an indirect contact with the lower end surface of the second bearing 43 via the washer 58, thereby preventing the rotor assembly 50 from moving downward. With such arrangement, the friction between the second bearing 43 and the top portion 2211 of the first protrusion 221 may be reduced. The transition portion 2213 is obliquely arranged, and the top portion 2211 is connected to the side portion 2212 by the transition portion 2213. The transition portion 2213 allows the rotor assembly 50 to be spaced apart from the second stop 2 by a certain distance, thereby preventing the rotor assembly 50 from interfering with the second stop 2 during the movement.

Figure 8:
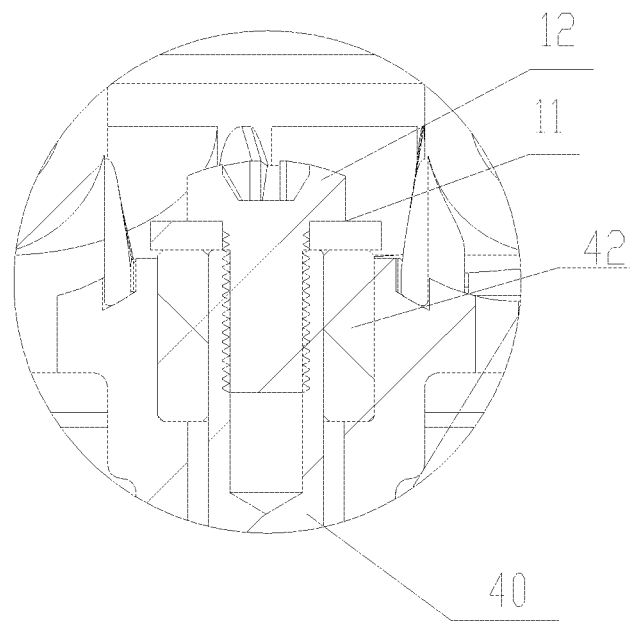
FIG. 8 is a partially enlarged schematic view showing the structure of part M of the electric pump in FIG. 2.

Referring to FIG. 8, the first stop 1 includes a stop element 11 and a connecting element 12, and the connecting element 12 is connected to the shaft 40. The stop element 11 is fixed to the shaft 40 via the connecting element 12. The stop element 11 limits a distance of the rotor assembly 50 moving axially upward along the shaft 40 and limits a position at which the rotor assembly 50 stops, thus allowing a maximum distance of the axial movement of the rotor assembly 50 towards the second portion of the shaft to be not beyond the position at which the stop element 11 is fixed on the shaft 40.

Referring to FIG. 9, the stop element 11 is made of a metal, and has a certain thickness and a certain hardness. A central hole 110 is provided in the stop element 11. The stop element 11 includes an upper end surface 111 of the stop element and a lower end surface 112 of the stop element. The upper end surface 111 and the lower end surface 112 of the stop element 11 are performed with surface treatment, or at least the lower end surface 112 is performed with surface treatment. The treatment of the lower end surface 112 may reduce a friction factor of the lower end surface 112 of the stop element 11 in contact with the first bearing 42. In this way, when the electric pump 100 is operating, a friction force between the rotor assembly 50 and the stop element 11 may be reduced. Generally, a surface roughness of the lower end surface 112 of the stop element 11 is less than 1.6. In this embodiment, in order to avoid errors of mounting, the surface roughness of each of the upper end surface 111 and the lower end surface 112 is less than 1.6. The central hole 110 of the stop element 11 is for the connecting element 12 to extend through and be fixed to the shaft 40. In order to reduce the abrasion of the stop element 11, at least the lower end surface 112 is coated with a diamond-like carbon. In order to prevent the error of mounting, both the upper end surface 111 and the lower end surface 112 may be coated with diamond-like carbon.

The connecting element 12 includes a screw, and the screw has a plane portion fitting and being in contact with the upper end surface 111 of the stop element 11. The shaft 40 includes a connecting portion, which is configured to fit and connect with the connecting element 12. The connecting portion includes the threaded hole 4011, and the screw is in a threaded connection with the threaded hole 4011. The screw presses the stop element 11 onto the second portion of the shaft 40 to allow the stop element 11 to be fixedly connected to the shaft 40.

When the rotor assembly 50 is started, the rotor assembly 50 moves along the shaft 40 towards a side where the second portion 402 of the shaft 40 is arranged, and then the first bearing 42 is in contact with the stop element 11 and moves relative to the stop element 11. The stop element 11 is fixed to the shaft 40 relatively, in this way, friction occurs only between end surfaces of the stop element 11 and the first bearing 42 of the rotor assembly 50, and no abrasion occurs between the stop element 11 and the shaft 40 when there is no relative movement between the stop element 11 and the shaft 40. Each of the shaft 40, the stop element 11 and the connecting element 12 is made of a metal, and the material of the first bearing 42 is abrasion resistant nonmetallic material such as graphite material. In this way, the stop element 11 contacts with the first bearing 42 which is made of a nonmetallic material, which facilitates increasing the service life of the first stop 1 of the rotor assembly 50. Furthermore, the material of the shaft is of a certain lubricity, and the lower end surface 111 of the stop element 11 is relatively smooth, thus a sliding friction force between the shaft 40 and the stop element 11 is relatively small, thereby having a relatively small adverse affect on the rotation of the rotor assembly 50. When the electric pump 100 does not operate, the stop element 11 is spaced apart from the upper end surface of the first bearing 42 of the rotor assembly 50 by a certain distance. Since the rotor assembly 50 may move towards the second portion 402 of the shaft 40 along the axial direction of the shaft 40 when the rotor assembly 50 operates, the arrangement of the certain clearance provides a certain allowance for the movement of the rotor assembly 50 when the rotor assembly 50 is started.

In order to prevent the connecting element 12 from loosening during the operation of the rotor assembly 50, adhesive may be further coated between the connecting element 12 and the shaft 10. Specifically, the adhesive may be coated on an outer surface of a threaded section of the screw, or coated on a side wall of a threaded section of the threaded hole 4011. In addition, a rotation direction of the connecting element 12 may be set to be the same as the rotation direction of the rotor assembly 50. Specifically, a screw-in direction of the screw is set to be consistent with the rotation direction of the rotor assembly 50. Specifically, referring to FIG. 10 the rotor assembly 50 includes the impeller 5, the impeller 5 includes first blades 521, and each of the first blades 521 includes a first side 733 and a second side 744. The screw-in direction of the screw is the same as protruding directions of the first sides 733 of the first blades 521, or in other words, seeing from the upper plate 51 towards the lower plate 53, the screw-in direction of the screw is a clockwise direction, and likewise, the rotation direction of the rotor assembly 50 is also the clockwise direction. In this case, when the rotor assembly 50 rotates, the force of the rotor assembly 50 driving the screw is in a direction of tightening the screw, thus ensuring operation reliability of the pump.

Figure 10:
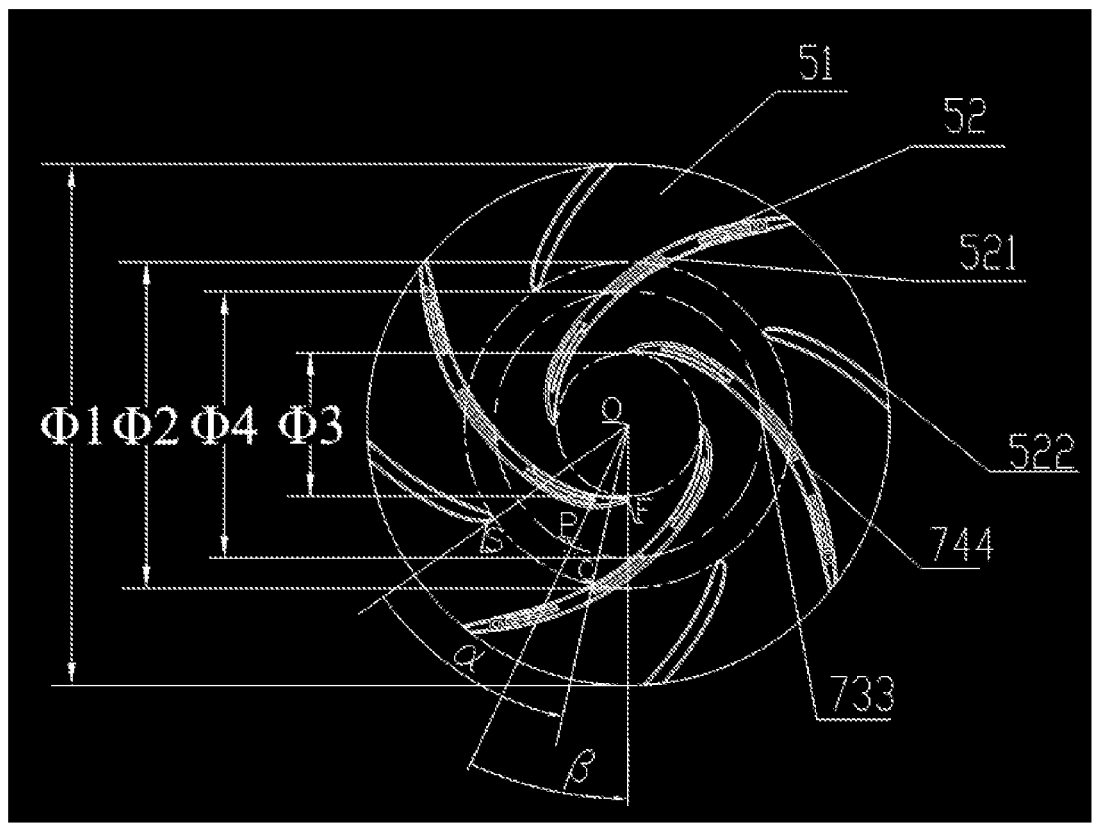
FIG. 10 is a front schematic view showing the structure of a first part of the rotor assembly in FIG. 3.
Figure 11:
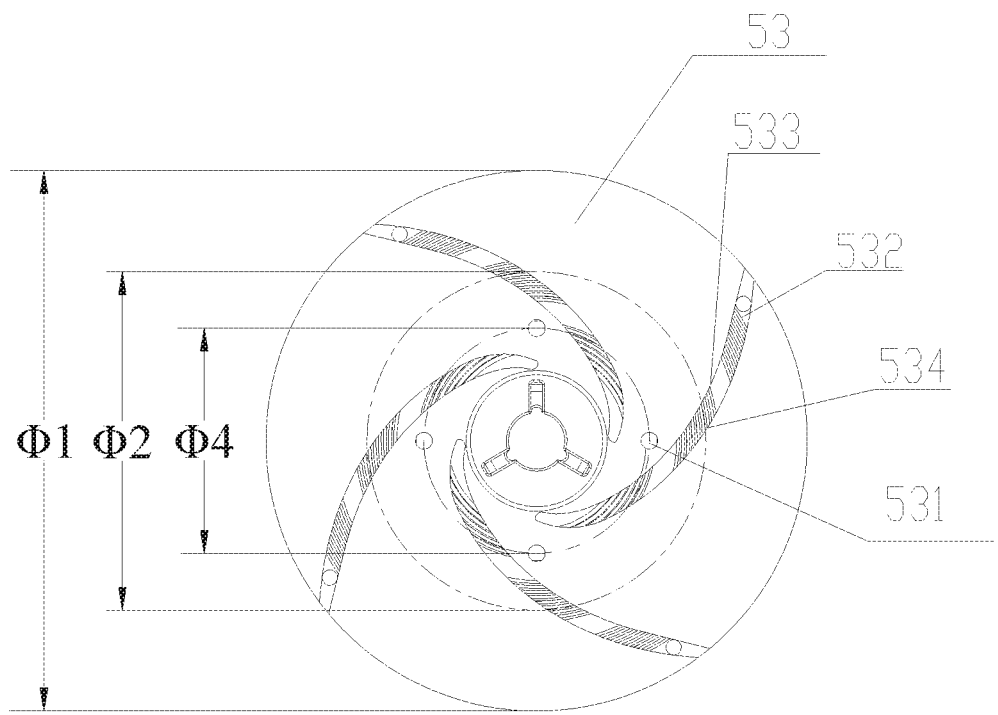
FIG. 11 is a front schematic view showing the structure of the second part in FIG. 6.

Reference is made to FIGS. 3, 10 and 11, the impeller 5 includes the upper plate 51, the lower plate 53 and the blades 52. The blades 52 are arranged between the upper plate 51 and the lower plate 53. The blades 52 include first blades 521 and second blades 522, and each of the first blades 521 has a length greater than a length of each of the second blades 522. The first blades 521 and the second blades 522 are alternately distributed. In this embodiment, the impeller 5 includes four first blades 521 and four second blades 522. An outer edge of the upper plate 51 or an outer edge of the lower plate 53 is defined as a first circumference, and a diameter of the first circumference is a first diameter $\Phi 1$. The second blades 522 start from a second circumference, and a diameter of the second circumference is a second diameter $\Phi 2$. The second diameter $\Phi 2$ ranges from 0.6 times to 0.7 times of the first diameter $\Phi 1$. Each of the first blades 521 includes a first side 733 and a second side 744, and the first side 733 is a concave side, and the second side 744 is a convex side. A third circumference is defined as a circumference where the first blades 521 start from, a diameter of the third circumference is a third diameter $\Phi 3$, and the third diameter $\Phi 3$ is less than the second diameter $\Phi 2$.

In this embodiment, the blades 52 and the upper plate 51 are integrally formed by injection molding, and the lower plate 53 is provided with mounting grooves 532. The mounting grooves 532 correspond to the first blades 521. Each of the mounting grooves 532 includes a concave side 533 and a convex side 534, the concave side 533 corresponds to the first side 733 of the first blade 521, and the convex side 534 corresponds to the second side 744 of the first blade 521. The first blades are mounted into the mounting grooves correspondingly, and the first blades 521 are integrally fixed to the lower plate 53 by welding.

In order to further balance axial forces of two ends of the rotor assembly 50, and reduce the abrasion of the stop element 11 of the first stop 1, balance holes 531 are provided in the lower plate 53 of the impeller 5. The balance holes 531 allows pressures between an upper side and a lower side of the lower plate 53 to be balanced, which facilitates reducing an action force applied by the rotor assembly 50 when the rotor assembly 50 starts, and facilitates reducing the abrasion of the stop element 11 caused by the rotor assembly 50.

Centers of the balance holes 531 are located on a fourth circumference, and the diameter of the fourth circumference is a fourth diameter $\Phi 4$. The fourth diameter $\Phi 4$ is larger than the third diameter $\Phi 3$ and less than the second diameter $\Phi 2$. In this case, each balance hole 531 is arranged between adjacent first blades 521 as much as possible, and is located in a region between the third circumference and the second circumference, which facilitates reducing an adverse effect on flow of the working medium flowing through the impeller 5 caused by the balance holes 531.

The number of the balance holes 531 is greater than or equal to two, and a total flowing area of the balance holes 531 is equal to the sum of flowing areas of the balance holes 531. An annular clearance 301 is formed between an outer edge of the impeller 5 and the housing, and the working medium passes through the annular clearance 301. The annular clearance 301 has an annular cross-sectional flowing area for the working medium, and the total flowing area of the balance holes 531 is larger than or equal to the annular cross-sectional flowing area. When the electric pump 100 operates, the working medium enters the impeller 5, flows through the annular clearance 301 and enters a part, below the lower plate 53, of the wet chamber 91. In this case, a part, above the lower plate 53, of the wet chamber 91 is in communication with the part, below the lower plate 53, of the wet chamber 91 via the annular clearance 301. Since a pressure of the working medium is increased gradually from a center of the impeller 5 to the outer edge of the impeller 5, a pressure at the part, below the lower plate 53, of the wet chamber 91 is generally the same as a pressure at the outer edge of the impeller 5. In this way, the pressure at the part, below the lower plate 53, of the wet chamber 91 is larger than a pressure at the part, above the lower plate 53, of the wet chamber 91. Due to the action of the pressure difference, the impeller 5 drives the rotor assembly 50 to move towards the second portion 402 of the shaft 40. In this embodiment, the total flowing area of the balance holes 531 is ensured to be larger than or equal to the annular cross-sectional flowing area. Since a pressure of the working medium at the clearance 301 is larger than a pressure of the working medium at the balance holes 531, the total flowing area of the balance holes 531 may be increased to further decrease the pressure difference. With such design, decrease of the pressure difference is facilitated, a pressure applied by the rotor assembly 50 when the rotor assembly 50 moves towards the second portion 402 of the shaft 40 is reduced, and further a force subjected by the first stop 1 is reduced, thus the abrasion is reduced. Specifically, the total flowing area of the balance holes 531 is greater than or equal to 3 mm$^2$ and less than or equal to 18 mm$^2$. The impeller 5 includes four balance holes 531, the balance holes 531 each have a generally circular-shaped circulation section, and a flowing area of each of the balance holes 531 is greater than 1.7 mm$^2$ and less than 3.2 mm$^2$. In this way, not only the communication of the working medium is ensured, but also the working of the working medium between the blades adjacent to each other is not affected.

After the impeller is assembled, each of the balance holes 531 is arranged between the first blades 521 that are adjacent. Specifically, each of the balance holes 531 is arranged between the mounting grooves 532 that are adjacent. A distance between an outer edge of a balance hole 531 and a concave side 533 of a mounting groove 532 close to the balance hole 531 is greater than or equal to 1 mm. Further, in the case that the balance holes 531 are projected onto the corresponding upper plate 51, in a direction from the lower end surface towards the upper end surface of the upper plate 51 and along an axial direction of the impeller 5, a connecting line between a starting end S of the second blade 522 and a center O of the impeller is defined as a first line SO. A connecting line between a starting end F of the first blade 521 which is adjacent to the concave side of the second blade 522 and the center O of the impeller is defined as a second line FO. A connecting line between a center P of the balance hole 531 and the center O of the impeller is defined as a third line PO. A connecting line between an intersection point C of the second circumference with the first side of the first blade close to the balance hole and the center O of the impeller is defined as a fourth line CO. An included angle between the first line SO and the fourth line CO is defined as a first included angle $\alpha$. An included angle between the third line PO and the second line FO is a second included angle $\beta$, and the second included angle $\beta$ is less than the first included angle $\alpha$.

It should be noted that, the above embodiments are only intended for describing the present application, and should not be interpreted as limitation to the technical solutions of the present application. Although the present application is described in detail in conjunction with the above embodiments, it should be understood by the person skilled in the art that, modifications or equivalent substitutions may still be made to the present application by the person skilled in the art; and any technical solutions and improvements of the present application without departing from the spirit and scope thereof also fall into the scope of the present application defined by the claims.

The invention claimed is:

1. An electric pump, comprising a housing, a shaft and a rotor assembly, a chamber being formed in the housing, and the rotor assembly being arranged in the chamber, wherein:
the shaft comprises a first portion and a second portion, the first portion is fixed to the housing, and the second portion is in non-direct contact with the housing;
the rotor assembly is rotatable about the shaft, and the rotor assembly is sleeved on the shaft;
the electric pump comprises a stop assembly, the stop assembly is configured to limit a position of the rotor assembly in the chamber and comprises a first stop and a second stop; and
the first stop is configured to limit a position of the rotor assembly moving along the shaft in a direction away from the first portion, and the second stop is configured to limit a position of the rotor assembly moving along the shaft in a direction towards the first portion, the first stop is fixed to the second portion, and the second stop is fixed to the first portion;
wherein the first stop comprises a connecting element and a stop element, the connecting element is fixed to the second portion, and the stop element is arranged between the connecting element and the second portion and is pressed onto the second portion;
wherein the shaft comprises a connecting portion, and the connecting element is connected to the shaft via the connecting portion; the connecting portion comprises a threaded hole, and the threaded hole extends into the second portion; and the connecting element comprises a screw, the screw is in a threaded connection with the shaft, and the stop element is pressed onto the second portion of the shaft by the screw; and
wherein a hole is provided in the stop element, the hole is smaller than an outer edge of the second portion, and a size of an outer edge of the stop element is larger than a size of an outer periphery of the second portion.

2. The electric pump according to claim 1, wherein the stop element comprises an upper end surface and a lower end surface, the upper end surface is in contact with the screw, the lower end surface is in contact with the second portion.

3. The electric pump according to claim 2, wherein the stop element comprises a coating, at least a lower end surface of the stop element is coated with the coating, and the coating is made of a diamond-like carbon.

4. The electric pump according to claim 1, wherein adhesive is coated on a threaded section of the threaded hole and/or an outer surface of a threaded section of the screw, and an outer peripheral surface of the screw is non-detachably fixed to the shaft provided with the threaded hole by the adhesive.

5. The electric pump according to claim 1, wherein the rotor assembly comprises an impeller, the impeller comprises an upper plate, blades and a lower plate;
the blades are arranged between the upper plate and the lower plate; and
seeing from the upper plate towards the lower plate, each of the blades comprises a convex side and a concave side, and a screw-in direction of the screw is consistent with a protruding direction of the convex sides of the blades.

6. The electric pump according to claim 2, wherein the rotor assembly comprises a bearing, the bearing is fixed to the rotor assembly by injection molding;
in an axial direction of the shaft, a surface, close to the second portion of the shaft, of the bearing is an upper end surface, the upper end surface of the bearing is spaced apart from the lower end surface of the stop element by a certain distance, and the upper end surface of the bearing is higher than an upper end of the lower plate.

7. The electric pump according to claim 1, wherein the rotor assembly comprises a rotor and an impeller, the rotor is fixed to the impeller, the rotor comprises a permanent magnet, and the impeller comprises an upper plate, a lower plate and blades;
the blades are formed between the upper plate and the lower plate, the blades comprise first blades and second blades, each of the first blades has a length larger than a length of each of the second blades, and the first blades and the second blades are alternately distributed;
an outer edge of the upper plate is defined as a first circumference, the second blades start from a second circumference, a diameter of the first circumference is a first diameter, a diameter of the second circumference is a second diameter, and the second diameter ranges from 0.6 times to 0.7 times of the first diameter; and
a third circumference is defined as a circumference where the first blades starts from, a diameter of the third circumference is a third diameter, the lower plate of the impeller is provided with balance holes, centers of the balance holes are located on a fourth circumference, a diameter of the fourth circumference is a fourth diameter, the fourth diameter is larger than the third diameter, and the fourth diameter is less than the second diameter.

8. The electric pump according to claim 7, wherein the number of the balance holes is greater than or equal to two, a total flowing area of the balance holes is equal to the sum of flowing areas of the balance holes; and an annular clearance is formed between an outer edge of the impeller and the housing, the annular clearance has an annular cross-sectional flowing area for a working medium passing through the annular clearance, and the total flowing area of the balance holes is larger than or equal to the annular cross-sectional flowing area.

9. The electric pump according to claim 7, wherein the number of the balance holes is greater than or equal to two, a total flowing area of the balance holes is equal to the sum of flowing areas of the balance holes, and the total flowing area of the balance holes is greater than or equal to 3 mm$^2$ and less than or equal to 18 mm$^2$.

10. The electric pump according to claim 9, wherein the number of the balance holes is less than or equal to the number of the first blades, each of the balance holes is arranged between the first blades that are adjacent, each of the balance holes has a circulation section which is generally circular-shaped, and a flowing area of each of the balance holes is greater than or equal to 1.7 mm$^2$ and less than or equal to 3.2 mm$^2$.

11. The electric pump according to claim 10, wherein the first blades and the upper plate are fixed integrally, the lower plate is provided with mounting grooves, the mounting grooves are arranged to correspond to the first blades, each of the balance holes is arranged between the mounting grooves that are adjacent, a distance between a concave side of a mounting groove closer to the balance hole and an outer edge of the balance hole is greater than or equal to 1 mm.

12. The electric pump according to claim 10, wherein:
in the case that the balance holes are projected onto the upper plate in a direction from the lower end surface to the upper end surface of the upper plate and along the axial direction of the impeller,
a connecting line between a starting end of each of the second blades and the center of the impeller is defined as a first line;
a connecting line between a starting end of each of the first blades which are adjacent to the concave sides of the second blades and the center of the impeller is defined as a second line;
a connecting line between the center of each of balance holes and the center of the impeller is defined as a third line; and
a connecting line between, an intersection point of the second circumference with the first side of the first blade close to the balance hole, and the center of the impeller is defined as a fourth line; and
an included angle between the first line and the fourth line is defined as a first included angle, an included angle between the third line and the second line is defined as a second included angle, and the second included angle is less than the first included angle.

* * * * *